US009346164B1

(12) United States Patent
Edsinger et al.

(10) Patent No.: US 9,346,164 B1
(45) Date of Patent: May 24, 2016

(54) PROGRAMMING AND EXECUTION OF FORCE-BASED TASKS WITH TORQUE-CONTROLLED ROBOT ARMS (71) Applicant: Redwood Robotics, Inc., San Francisco, CA (US)

(72) Inventors: Aaron Edsinger, San Francisco, CA (US); Advait Jain, San Francisco, CA (US); Anthony Rizzi Jules, Oakland, CA (US)

(73) Assignee: Redwood Robotics Inc., San Francisco, CA (US)

(*) Notice: Subject to any disclaimer, the term of this patent is extended or adjusted under 35 U.S.C. 154(b) by 0 days.

(21) Appl. No.: 14/878,329

(22) Filed: Oct. 8, 2015

Related U.S. Application Data (63) Continuation of application No. 14/312,877, filed on Jun. 24, 2014, now Pat. No. 9,186,795.

(60) Provisional application No. 61/838,718, filed on Jun. 24, 2013.

(51) Int. Cl.
G05B 15/00 (2006.01)
B25J 9/16 (2006.01)
B25J 11/00 (2006.01)

(52) U.S. Cl.
CPC .............. *B25J 9/1664* (2013.01); *B25J 9/1633* (2013.01); *B25J 9/1694* (2013.01); *B25J 11/0065* (2013.01); *Y10S 901/09* (2013.01)

(58) Field of Classification Search
None
See application file for complete search history.

(56) References Cited

U.S. PATENT DOCUMENTS

| 6,424,885 | B1* | 7/2002 | Niemeyer | A61B 19/22 600/109 |
| 8,641,113 | B1* | 2/2014 | Russell | E21B 31/00 294/86.1 |
| 2005/0027397 | A1* | 2/2005 | Niemeyer | A61B 19/22 700/245 |
| 2005/0200324 | A1* | 9/2005 | Guthart | A61B 19/22 318/568.11 |
| 2013/0245824 | A1* | 9/2013 | Barajas | B25J 9/1664 700/253 |
| 2014/0039681 | A1* | 2/2014 | Bowling | A61B 19/2203 700/261 |
| 2014/0156129 | A1* | 6/2014 | Tabata | B60K 6/48 701/22 |
| 2014/0183979 | A1* | 7/2014 | Pelrine | H02K 41/03 310/12.05 |
| 2014/0222207 | A1* | 8/2014 | Bowling | A61B 19/2203 700/261 |
| 2014/0243849 | A1* | 8/2014 | Saglam | A61B 18/22 606/130 |
| 2014/0249675 | A1* | 9/2014 | Krishnasamy | H01L 21/67259 700/250 |
| 2014/0259599 | A1* | 9/2014 | Glaspell | B25B 21/00 29/407.04 |

* cited by examiner

Primary Examiner — Ian Jen (74) Attorney, Agent, or Firm — McDonnell Boehnen Hulbert & Berghoff LLP (57) ABSTRACT A robotic device may receive task information defining (i) a nominal trajectory for an end-effector coupled to a manipulator of the robotic device, and (ii) forces to be exerted by the end-effector along the nominal trajectory; determining, based on the task information, a modified trajectory that is offset from the nominal trajectory; determining, based on the modified trajectory and the forces, torques to be applied to the manipulator over time; causing the torques to be applied to the manipulator so as to cause the end-effector to follow the modified trajectory and substantially exert the forces along the modified trajectory; receiving force feedback information from a sensor coupled to the robotic device indicating respective forces being experienced by the end-effector at respective points along the modified trajectory; and adjusting the torques to be applied to the manipulator based on the force feedback information.

20 Claims, 7 Drawing Sheets

COMPUTER PROGRAM PRODUCT 700

SIGNAL BEARING MEDIUM 701

PROGRAM INSTRUCTIONS 702

- RECEIVING TASK INFORMATION DEFINING (I) A NOMINAL TRAJECTORY FOR AN END-EFFECTOR COUPLED TO A MANIPULATOR OF A ROBOTIC DEVICE, AND (II) FORCES TO BE EXERTED BY THE END-EFFECTOR AT POINTS ALONG THE NOMINAL TRAJECTORY, WHERE THE ROBOTIC DEVICE INCLUDES A JOINT COUPLED TO THE MANIPULATOR

- DETERMINING, BASED ON THE TASK INFORMATION, A MODIFIED TRAJECTORY THAT IS OFFSET FROM THE NOMINAL TRAJECTORY SO AS TO CAUSE THE FORCES TO BE EXERTED BY THE END-EFFECTOR

- DETERMINING, BASED ON THE MODIFIED TRAJECTORY AND THE FORCES, TORQUES TO BE APPLIED TO THE MANIPULATOR VIA THE JOINT OF THE ROBOTIC DEVICE OVER TIME

- CAUSING THE TORQUES TO BE APPLIED TO THE MANIPULATOR VIA THE JOINT SO AS TO CAUSE THE END-EFFECTOR TO FOLLOW THE MODIFIED TRAJECTORY AND SUBSTANTIALLY EXERT THE FORCES ALONG THE MODIFIED TRAJECTORY

- AS THE END-EFFECTOR FOLLOWS THE MODIFIED TRAJECTORY, RECEIVING FORCE FEEDBACK INFORMATION FROM A SENSOR COUPLED TO THE ROBOTIC DEVICE INDICATING RESPECTIVE FORCES BEING EXPERIENCED BY THE END-EFFECTOR AT RESPECTIVE POINTS ALONG THE MODIFIED TRAJECTORY

- ADJUSTING THE TORQUES TO BE APPLIED TO THE MANIPULATOR BASED ON THE FORCE FEEDBACK INFORMATION AS THE END-EFFECTOR FOLLOWS THE MODIFIED TRAJECTORY

| COMPUTER READABLE MEDIUM 703 | COMPUTER RECORDABLE MEDIUM 704 | COMMUNICATIONS MEDIUM 705 |

FIGURE 7

PROGRAMMING AND EXECUTION OF FORCE-BASED TASKS WITH TORQUE-CONTROLLED ROBOT ARMS

CROSS REFERENCE TO RELATED APPLICATION

The present application claims priority to U.S. patent application Ser. No. 14/312,877 filed on Jun. 24, 2014, and entitled "Programming and Execution of Force-Based Tasks with Torque-Controlled Robot Arms," which claims priority to U.S. Provisional patent application No. 61/838,718 filed on Jun. 24, 2013, and entitled "Programming and Execution of Force-Based Tasks with Torque-Controlled Robot Arms," both of which are herein incorporated by reference as if fully set forth in this description.

BACKGROUND

Robotic systems, such as a robotic manipulator having an end-effector, may be used for performing tasks involving picking up and moving objects, inserting objects, machining parts, etc. For instance, a robotic device may be used to polish an object having a particular geometry. Such a robotic device may direct a robotic manipulator to follow a certain trajectory to perform a given task.

SUMMARY

The present disclosure describes embodiments that relate to programming and execution of force-based tasks with torque-controlled robot arms. In one aspect, the present disclosure describes a method. The method includes receiving task information defining (i) a nominal trajectory for an end-effector coupled to a manipulator of a robotic device, and (ii) forces to be exerted by the end-effector at points along the nominal trajectory, where the robotic device includes a joint coupled to the manipulator. The method also includes determining, based on the task information, a modified trajectory that is offset from the nominal trajectory so as to cause the forces to be exerted by the end-effector. The method further includes determining, based on the modified trajectory and the forces, torques to be applied to the manipulator via the joint of the robotic device over time. The method also includes causing the torques to be applied to the manipulator via the joint so as to cause the end-effector to follow the modified trajectory and substantially exert the forces along the modified trajectory. The method further includes, as the end-effector follows the modified trajectory, receiving force feedback information from a sensor coupled to the robotic device indicating respective forces being experienced by the end-effector at respective points along the modified trajectory. The method also includes adjusting the torques to be applied to the manipulator based on the force feedback information as the end-effector follows the modified trajectory.

In another aspect, the present disclosure describes a computer readable medium having stored thereon executable instructions that, upon execution by a computing device, cause the computing device to perform functions. The functions include receiving task information defining (i) a nominal trajectory for an end-effector coupled to a manipulator of a robotic device, and (ii) forces to be exerted by the end-effector at points along the nominal trajectory, where the robotic device includes a joint coupled to the manipulator. The functions also include determining, based on the task information, a modified trajectory that is offset from the nominal trajectory so as to cause the forces to be exerted by the end-effector. The functions further include determining, based on the modified trajectory and the forces, torques to be applied to the manipulator via the joint of the robotic device over time. The functions also include causing the torques to be applied to the manipulator via the joint so as to cause the end-effector to follow the modified trajectory and substantially exert the forces along the modified trajectory. The functions further include, as the end-effector follows the modified trajectory, receiving force feedback information from a sensor coupled to the robotic device indicating respective forces being experienced by the end-effector at respective points along the modified trajectory. The functions also include adjusting the torques to be applied to the manipulator based on the force feedback information as the end-effector follows the modified trajectory.

In still another aspect, the present disclosure describes a robotic device. The robotic device includes a manipulator, an end-effector coupled to the manipulator, a sensor, and a joint coupled to the manipulator. The robotic device also includes one or more processors. The robotic device further includes a memory having stored thereon executable instructions that, upon execution by the one or more processors, cause the robotic device to perform functions. The functions include receiving task information defining (i) a nominal trajectory for the end-effector, and (ii) forces to be exerted by the end-effector at points along the nominal trajectory. The functions also include determining, based on the task information, a modified trajectory that is offset from the nominal trajectory so as to cause the forces to be exerted by the end-effector. The functions further include determining, based on the modified trajectory and the forces, torques to be applied to the manipulator via the joint over time. The functions also include causing the torques to be applied to the manipulator via the joint so as to cause the end-effector to follow the modified trajectory and substantially exert the forces along the modified trajectory. The functions further include, as the end-effector follows the modified trajectory, receiving force feedback information from the sensor indicating respective forces being experienced by the end-effector at respective points along the modified trajectory. The functions also include adjusting the torques to be applied to the manipulator based on the force feedback information as the end-effector follows the modified trajectory.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

I. Introduction

In some examples, a robotic device having a manipulator and an end-effector (e.g., end-of-arm tool) can be programmed by defining a trajectory to be followed by the end-effector. In these examples, the robotic device is position-controlled and may be configured to repeat a given trajectory consistently. In some cases, despite such consistency, such a programming method (i.e., position control of an end-effector) may not be suitable for force-based tasks such as deburring, grinding, insertion with tight tolerances, polishing, etc.

In examples, force-based tasks may be specified in terms of forces to be exerted by the end-effector at different points along a trajectory. Programming the robotic device by defining the trajectory to be followed by the end-effector, as is done in position-controlled robots, may result in inconsistencies while performing force-based tasks unless the robotic device's environment is arranged to be the same each time the task is performed. In an example, unknown disturbances or changes in the robotic device's environment may cause inaccuracies in performing a force-based task while implementing a position-control method for the robotic device. In another example, position-based robot controllers may generally exhibit high impedance, and thus the speed at which these controllers respond or comply to an unknown force is limited. Therefore, programming a robotic device based on position control of an end-effector may not be suitable for force-based tasks. Disclosed herein are systems and methods for programming a robotic device to execute force-based tasks.

II. Example Systems

Figure 1:
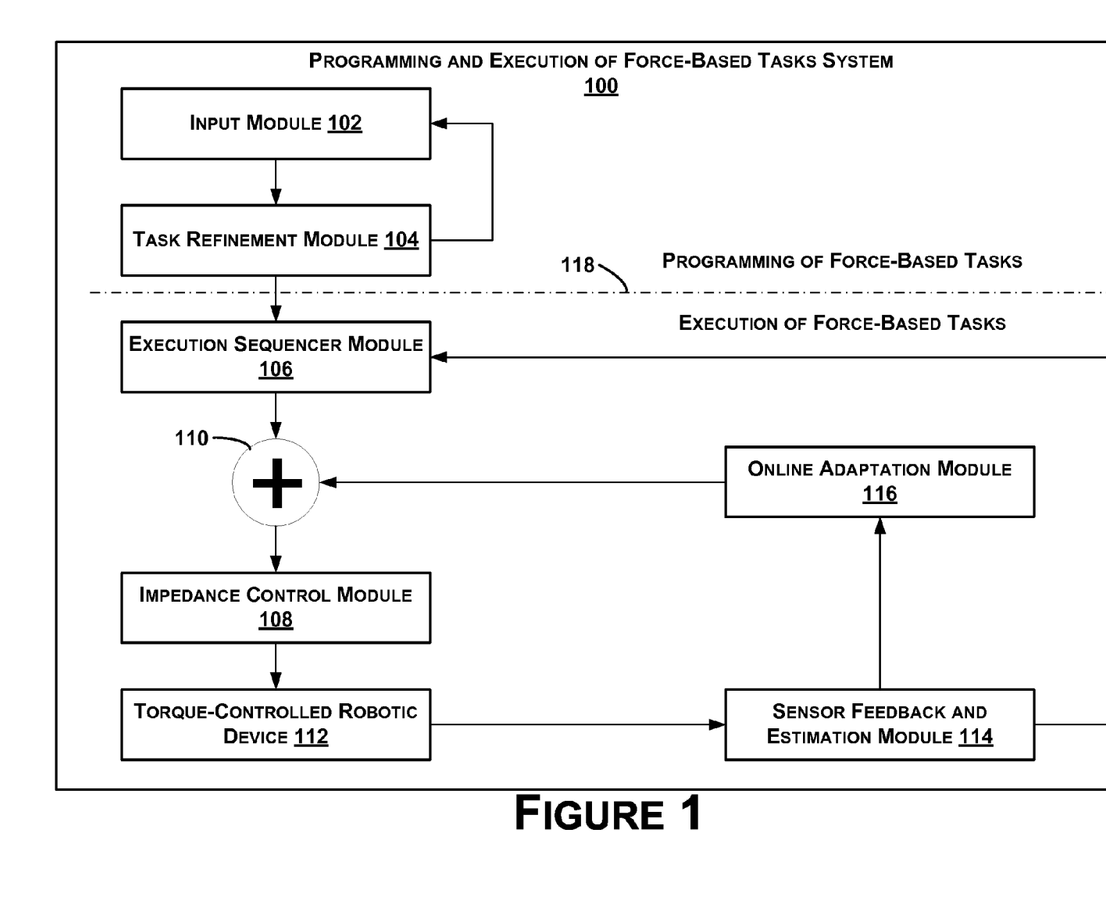
FIG. 1 illustrates a block diagram of an example system for programming and execution of force-based tasks with torque-controlled robotic devices, in accordance with an example embodiment.

Referring now to the Figures, FIG. 1 illustrates a block diagram of an example system 100 for programming and execution of force-based tasks with torque-controlled robotic devices, in accordance with an embodiment. The system 100 includes an input module 102, a task refinement module 104 in communication with the input module 102, an execution sequencer module 106 in communication with the task refinement module 104, an impedance control module 108 in communication with the execution sequencer module 106 through a summation junction 110, a torque-controlled robotic device 112 in communication with the impedance control module 108, and a sensor feedback and estimation module 114 in a communication with the torque-controlled robotic device 112 and an online adaptation module 116. The torque-controlled robotic device 112 may include one or more manipulators coupled to each other via respective joints that may be configured to control motion of respective manipulators. The online adaptation module 116 is also in communication with the impedance control module 108 via the summation junction 110. Modules above line 118 are related to programming a force-based task and modules below the line 118 are related to execution of a programmed task.

The input module 102 may be configured to receive information indicative of a nominal trajectory to be followed by an end-effector of the torque-controlled robotic device 112 and forces to be exerted by the end-effector along the nominal trajectory to perform a task. In one example, the information may be received through a user-input. For instance, the system 100 or the torque-controlled robotic device 112 may include a user-interface configured to allow a user to input the information. For example, the user-interface may include a plurality of user-interface items, each item being associated with selecting a parameter that defines an aspect of the trajectory to be followed by the end-effector or the forces to be exerted by the end-effector to perform the task. As an example, a parameter may be associated with an equation that describes a trajectory of the end-effector in a Cartesian coordinate system. Another parameter may define an amount of force to be applied at a given point or incremental increase in forces along a given trajectory. These are examples for illustrations only, and other parameters that describe the trajectory and the forces are contemplated.

In another example, the information indicative of the nominal trajectory and the forces may be received or inferred from a computer-aided design (CAD) model. For instance if a task is associated with polishing an object, a CAD model of the object may be received at the input module 102. The input module 102 may be configured to determine the nominal trajectory to be followed by the end-effector based on a contour of the object as defined by the CAD model. In still another example, the system 100 or the torque-controlled robotic device 112 may provide the CAD model to a user on a graphical user interface. The user may select edges in the CAD model that are to be deburred, locations to perform an insertion task, surfaces to be polished, or any other portions of the object based on the task to be performed. Based on the selection, the input module 102 may be configured to determine the nominal trajectory and the forces. The input module 102 may be configured to cause the torque-controlled robotic device 112 to contact the object at a various points on the object so as to localize the CAD model relative to the torque-controlled robotic device 112. The input module 102 may thus transform the nominal trajectory from the CAD model's coordinate system or frame to a frame of references associated with the torque-controlled robotic device 112.

In yet still another example, the input module 102 may be configured to receive the information indicative of the nominal trajectory and the forces by demonstration. In one case, the demonstration may involve a user grabbing a manipulator of the torque-controlled robotic device 112 and moving the manipulator, for example, to trace the contour of an object (e.g., object to be deburred, ground, polished, etc.) or to demonstrate an insertion operation. Demonstration could also involve providing inputs about the forces to be exerted by an end-effector coupled to the manipulator. As one example, the torque-controlled robotic device 112 may be configured to position the manipulator in a nominal posture and the user can push on the end-effector or manipulator to demonstrate the force to be exerted by the end-effector. Alternately, the user can remotely operate the torque-controlled robotic device 112 (e.g., from a phone, a tablet, a wearable computing device, etc.) to slowly increase the force or move the end-effector by small amounts until the force reaches a given value. In examples, instead of a user performing the demonstration, any other source of an external force can be used to apply a particular force or a sequence of forces to the end-effector and move the end-effector according to a given trajectory. For example, the external force may be applied using another robotic device. In another example, the external force may be specified using an instrumented spring. For instance, an input device including a torsion spring loaded dial having a potentiometer/encoder could be used. The input device may be coupled to the end-effector or the manipulator of the torque-controlled robotic device 112, and may be configured to apply a force in proportion to the dial displacement. A user holding the end-effector or manipulator may feel the applied force in proportion to the torsion spring compression. Other examples of input devices used to apply the external force are contemplated.

For a force-based task, deviations of the end-effector from this nominal trajectory may occur and may be permitted. For example, the nominal trajectory for an insertion task may include a path that the end-effector would follow if all the parts to be inserted in a given space had the same dimensions. Due to variation in this force-based task (e.g., due to any variation in dimensions of a part to be inserted), deviations from the nominal trajectory may occur during performance or execution of the task.

The task refinement module 104 may be configured to refine and transform the input received at the input module 102 into parameters for the impedance control module 108 to be used to command joint torques, and thus control the torque-controlled robotic device 112. The impedance control module 108 may be configured to cause the manipulator of the torque-controlled robotic device 112 to behave as if the manipulator, or an end-effector coupled to the manipulator, is attached to a virtual trajectory with virtual springs having parameters defined by stiffness and damping matrices. Determining the stiffness and damping matrices is described in more details at FIG. 5 below. In an example, the virtual trajectory is determined by modifying the nominal trajectory. For instance, the virtual or modified trajectory may be offset from the nominal trajectory so as to cause the forces to be exerted by the end-effector. In this instance, deviation from the virtual trajectory may result in a force proportional to the stiffness of the virtual springs. While following the virtual or modified trajectory, the manipulator or the end-effector can also apply a commanded force vector at any point by controlling a torque applied at a joint coupled to the manipulator.

The input module 102 and the task refinement module 104 may keep interacting, and several sets of refined parameters (e.g., torques to be applied, parameters for the impedance control module 108, parameters defined by stiffness and damping matrices of the virtual spring, etc.) can be generated by the task refinement module 104 until a set of parameters is determined to be satisfactory. Whether a set of parameters is satisfactory could be determined, for example, by commanding the torque-controlled robotic device 112 to perform the task (e.g., as a training or evaluation run) and evaluating (i) a degree of adherence of the end-effector to the modified trajectory, and (ii) the forces experienced by the end-effector along the modified trajectory in comparison with the forces defined by the input module 102 or the task refinement module 104.

The execution sequencer module 106 may be configured to command the torque-controlled robotic device 112, through the impedance control module 108, to perform the task by following the modified trajectory and applying the forces defined by the input module 102 and refined by the task refinement module 104.

The execution sequencer module 106 may also be configured to receive information from the sensor feedback and estimation module 114 during performance of the task so as to determine an appropriate rate (e.g., speed of motion of the manipulator of the torque-controlled robotic device 112) for commanding the torque-controlled robotic device 112 during execution of the task. The sensor feedback and estimation module 114 may be coupled to or in communication a plurality of sensors coupled to the manipulator and end-effector of the torque-controlled robotic device 112. The plurality of sensor may include, for example, position sensors, force sensors, torque sensors, vision sensors, etc. For instance, the sensor feedback and estimation module 114 may be configured to measure, via the plurality of sensors, forces experienced by the end-effector as the end-effector follows the modified trajectory, and compare these forces to the forces provided by the task refinement module 104. The force comparison may indicate how close the forces experienced by the end-effector are to the forces defined by the task refinement module 104 to be exerted by the end-effector, e.g., a percentage of error or deviation of a force experienced by the end-effector at a given point relative to the force the end-effector is commanded to exert at the given point. The sensor feedback and estimation module 114 may also be configured to measure, via the plurality of sensors, position or location of the end-effector and compare the measured position with the modified trajectory that is commanded by the execution sequencer module 106. The position comparison may indicate how close the end-effector is following the modified trajectory, e.g., a percentage of error or deviation of actual position of the end-effector relative to the commanded trajectory. Based on the comparisons, the commands from the execution sequencer module 106 to the impedance control module 108 may be adjusted at the junction 110 to improve performance of the task (e.g., reduce any errors deviations from the commanded trajectory and forces).

The online adaptation module 116 may be configured to have access to sensor information received at the sensor feedback and estimation module 114. In an example, the online adaptation module 116 may also be configured to estimate, or receive estimations of, contact properties between the end-effector and an object contacting the end-effector (e.g., the object being polished or deburred by the end-effector). As an example for illustration, while performing a deburring operation, the end-effector may suffer from wear and tear over time. In this example, the online adaptation module 116 may be configured to estimate the contact properties and the extent of wear and tear of the end-effector, and accordingly revise the modified trajectory. In this manner, the online adaptation module 116 may be configured to continuously monitoring the task, estimate contact and wear properties, and revise the task so as to enable robust execution of the task that accommodates any wear and tear to the end-effector. In another example, for an insertion task, there may be different strategies to perform the insertion with tight tolerances. The online adaptation module 116 may be configured to superimpose these strategies on the modified trajectory, for example, adding a wiggling motion or modification to the stiffness and damping matrices of the virtual spring attaching the end-effector to the modified trajectory based on the contact properties.

Further, based on the estimations of contact properties, the online adaptation module 116 may be configured to modify commands being communicated to the impedance control module 108 at the junction 110. Thus, parameters for the impedance control module 108 may be adjusted based on information received from the sensor feedback and estimation module 114 and the online adaptation module 116 so as to improve execution of the task. In this manner, the execution sequencer module 106, the online adaptation module 116, the impedance control module 108, the torque-controlled robotic device 112, and the sensor feedback and estimation module 114 are configured to constitute an autonomous closed-loop feedback control system.

In examples, the execution sequencer module 106 may be configured to command the torque-controlled robotic device 112 to repeat the task several times until the parameters for the impedance control module 108 are optimized to perform the task satisfactorily. Performing the portion of the task satisfactorily may be indicated, for example, by a degree of adherence of the torque-controlled robotic device 112 to the modified trajectory, and how close the forces being experienced by the torque-controlled robotic device 112 are to the forces received at the input module 102.

Components of the system 100 may be configured to work in an interconnected fashion with each other and/or with other components coupled to respective systems. One or more of the described functions or components of the system 100 may be divided up into additional functional or physical components, or combined into fewer functional or physical components. In some further examples, additional functional and/or physical components may be added to the examples illustrated by FIG. 1. Still further, any of the input module 102, the task refinement module 104, the execution sequencer module 106, the impedance control module 108, the summation junction 110, the sensor feedback and estimation module 114, and the online adaptation module 116 may include or be provided in the form of a processor (e.g., a microprocessor, a digital signal processor (DSP), etc.) configured to execute program code including one or more instructions for implementing logical functions described herein. The system 100 may further include any type of computer readable medium (non-transitory medium) or memory, for example, such as a storage device including a disk or hard drive, to store the program code. In an example, the system 100 may be included within other systems. In another example, the input module 102, the task refinement module 104, the execution sequencer module 106, the impedance control module 108, the summation junction 110, the sensor feedback and estimation module 114, and the online adaptation module 116 may be included within the torque-controlled robotic device 112.

III. Example Methods

Figure 2:
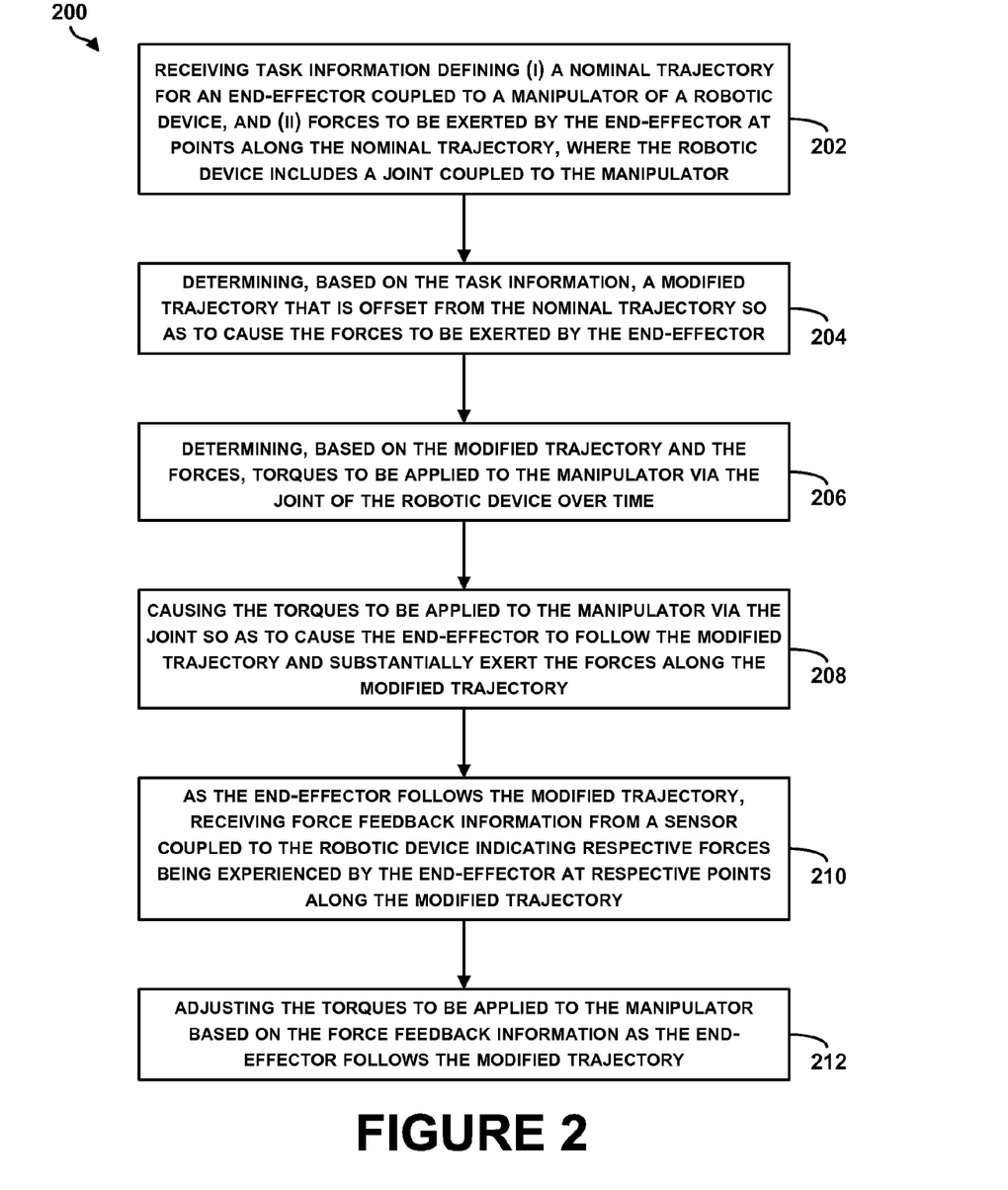
FIG. 2 is a flow chart of a method for controlling a robotic device, in accordance with an example embodiment.

FIG. 2 is a flow chart of a method 200 for controlling a robotic device, in accordance with an example embodiment. The method 200 may include one or more operations, functions, or actions as illustrated by one or more of blocks 202-212. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer-readable medium, for example, such as computer-readable media that stores data for short periods of time like register memory, processor cache and Random Access Memory (RAM). The computer-readable medium may also include non-transitory media or memory, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, a tangible storage device, or other article of manufacture, for example. In addition, for the method 200 and other processes and methods disclosed herein, each block in FIG. 2 may represent circuitry that is wired to perform the specific logical functions in the process. In an example, the system 100 described with respect to FIG. 1 may be configured to implement the method 200.

At block 202, the method 200 includes receiving task information defining (i) a nominal trajectory for an end-effector coupled to a manipulator of a robotic device, and (ii) forces to be exerted by the end-effector at points along the nominal trajectory, where the robotic device includes a joint coupled to the manipulator.

Figure 3:
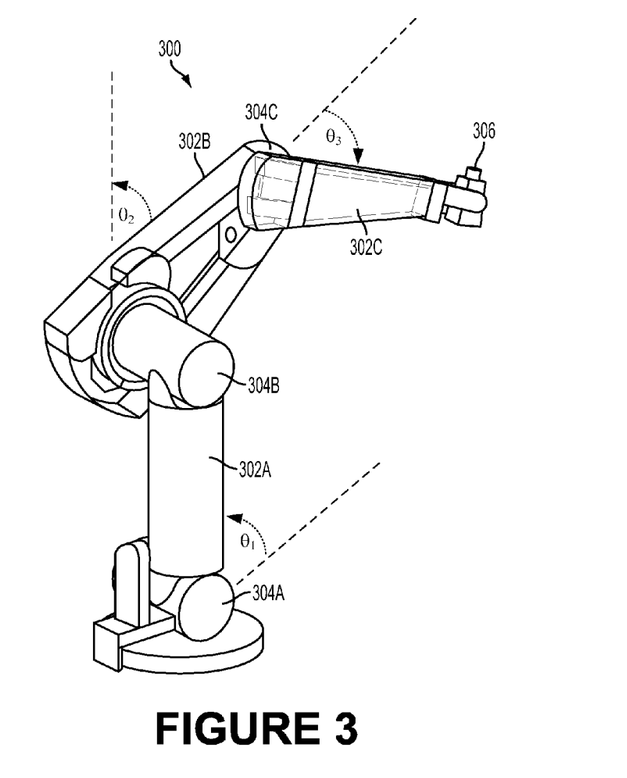
FIG. 3 illustrates an example robotic device, in accordance with an example embodiment.

FIG. 3 illustrates an example robotic device 300, in accordance with an example embodiment. The robotic device 300 may include a plurality of manipulator or arms such as the manipulators 302A, 302B, and 302C. The robotic device 300 may also include a plurality of joints 304A, 304B, and 304C. The joint 304A may be configured to connect or couples the manipulator 302A to fixed plane or frame of reference (e.g., ground). The joint 304B couples the manipulator 302B to the manipulator 302A, and the joint 304C couples the manipulator 302C to the manipulator 302B. In an example, the joints 304A, 304B, and 304C may include electric, hydraulic, linear, or any type of motors or actuators configured to drive the respective joints. For example, the joint 304A may be configured to apply, via any actuator coupled thereto, a torque to the manipulator 302A. In response, the manipulator 302A may follow a particular path while applying a particular force or a sequence of forces along the path. Similarly, the joints 304B and 304C may be configured to apply respective torques to the manipulators 302B and 302C so as to move the manipulators 302B and 302C according to particular respective paths and apply particular forces along the respective paths. The robotic device 300 may further include an end-effector 306 coupled to the manipulator 302C. As an example, the end-effector 306 may represent a robotic end-of-arm tool configured to perform a certain task such as deburring, polishing, grinding, capturing and placing an object.

A computing device may be configured to control the robotic device 300 to perform certain tasks. The computing device may be coupled to, included in, or remote from, but in communication with, the robotic device 300. The computing device may take any form. As examples, the computing device may include one or more general-purpose processors and/or one or more special-purpose processors (e.g., image processor, digital signal processor, etc.). To the extent that the computing device includes more than one processor, such processors could work separately or in combination. The computing device can be, for example, a mobile phone, personal digital assistant (PDA), laptop, notebook, or netbook computer, tablet computing device, a wearable computing device, etc. The computing device may be configured to control functions of the robotic device 300 based on inputs specifying a particular task to be performed by the robotic device 300. In an example, the computing device may include all or some of the input module 102, the task refinement module 104, the execution sequencer module 106, the impedance control module 108, the summation junction 110, the sensor feedback and estimation module 114, and the online adaptation module 116 described at FIG. 1.

Figure 4A:
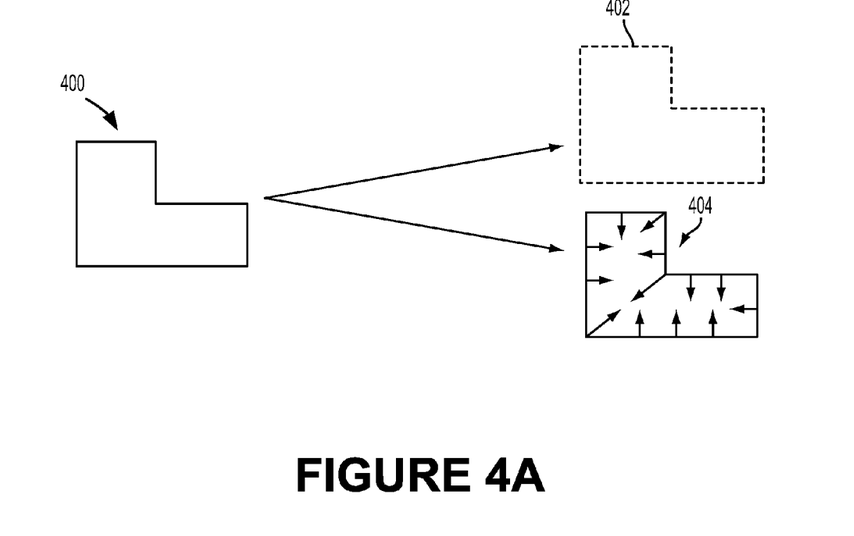
FIG. 4A illustrates an example task to be performed by the robotic device on an object, in accordance with an example embodiment.

FIG. 4A illustrates an example task to be performed by the robotic device 300 on an object 400, in accordance with an example embodiment. The task may, for example, include polishing, grinding, or deburring the object 400. The computing device may be configured to receive task information indicative of a nominal trajectory 402 represented by a dashed line in FIG. 4A and associated with the object 400 to be followed by the end-effector 306 of the robotic device 300. The task information may also be indicative of forces to be exerted by the end-effector 306 on the object 400 along the nominal trajectory 402 to perform a task. The nominal trajectory 402, for example, represents a contour of the object 400 to be followed or traced by the end-effector 306.

A visual representation 404 is shown in FIG. 4A to depict the forces to be exerted by the end-effector as defined by the task information. The visual representation 404 shows arrows that represent magnitude and direction of the forces to be exerted by the end-effector 306 along the nominal trajectory 402. For example, at a given point, a direction in which an arrow is pointing represents the direction in which a force is to be exerted or applied to the object 400 at the given point. A length of the arrow represents a magnitude of the force to be applied. Thus, the longer arrow the larger force to be applied.

Similar to the description provided with respect to the input module 102 in FIG. 1, the computing device may be configured to receive the task information through a user-input, a CAD model for the object 400, demonstration, or any other input means.

Referring back to FIG. 2, at block 204, the method 200 includes determining, based on the task information, a modified trajectory that is offset from the nominal trajectory so as to cause the forces to be exerted by the end-effector. Causing the end-effector 306 to follow the nominal trajectory 402 representing the contour of the object 400 may not be sufficient to cause the forces specified by the task information to be exerted by the end-effector 306. In order to induce the forces to be exerted on the object, the computing device controlling the robotic device 300 may be configured to determine a modified trajectory that is offset from the nominal trajectory 402. The computing device may be configured to cause the end-effector 306 to follow the modified trajectory instead of the nominal trajectory 402 so as to induce the forces specified by the task information to be exerted on the object 400.

Figure 4B:
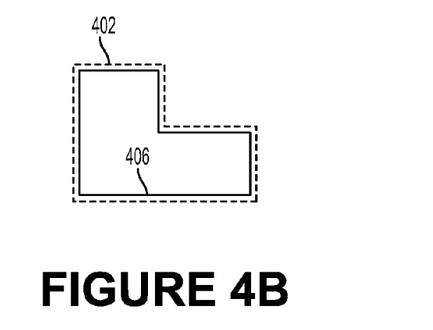
FIG. 4B illustrates a modified trajectory offset from a nominal trajectory, in accordance with an example embodiment.

FIG. 4B illustrates a modified trajectory 406 offset from the nominal trajectory 402, in accordance with an example embodiment. As shown in FIG. 4B, the modified trajectory 406 represented by a solid line is offset from the nominal trajectory 402 represented by the dashed line. In an example, the nominal trajectory 402 represents the contour of the object 400 and the modified trajectory 406 represents a prospective contour of the object 400 upon finishing the task (e.g., polishing, grinding, or deburring the object 400). As shown in FIG. 4B, the modified trajectory 406 is offset within the object 400 compared to the nominal trajectory 402, which traces the contour of the object. In this manner, if the end-effector 306 is to trace the modified trajectory 406, the end-effector 306 may remove material from a surface of the object 400 (e.g., during the polishing, grinding, or deburring task) and thus induce the forces specified by the task information to be exerted on the object 400. As an example, the offset between points of the modified trajectory 406 and the points of the nominal trajectory 402 may be proportional to the forces defined by the task information. As shown below at step 206 of the method 200, the end-effector 306 may be configured to behave dynamically as if the end-effector 306 is connected to the modified trajectory via a viscous spring. The offset may be based on stiffness and damping characteristics of the viscous spring.

In an example, the computing device may be configured to generate a display of the nominal trajectory 402, the modified trajectory 406, and the visual representation 404. The computing device may also provide a user-interface that allows for revising the task information by changing the nominal trajectory 402 and/or the forces to be exerted on the object 400. For instance, the computing device may provide a parametric representation of the nominal trajectory 402 and the forces as displayed and allow a user or some other input means to change parameters of the nominal trajectory 402 and/or the forces. As an example for illustration, a user may be able to elongate an arrow representing a force to be applied at a given point in order to increase the force to be exerted at the point. The user may also change a pointing direction of the arrow to change a direction in which the force is applied. In another example, the user may also change the modified trajectory 406 by, for example, modifying the offset between the nominal trajectory 402 and the modified trajectory 406. These are examples for illustration only, and other examples of revising the task information are contemplated.

Referring back to FIG. 2, at block 206, the method 200 includes determining, based on the modified trajectory and the forces, torques to be applied to the manipulator via the joint of the robotic device over time. The following equation describes operational space formulation of the dynamic module of a rigid robot manipulator in contact with an environment:

$$\Lambda(q)\dot{v}_e + \Gamma(q,\dot{q})v_e + \eta(q) = h_c - h_e \quad (1)$$

where q represents generalized coordinates for the robotic device that may be chosen, for example, to represent angles $\theta_1$, $\theta_2$, and $\theta_3$ of the joints of the robotic device; $\dot{q}$ is the rate of change of the generalized coordinates; $v_e$ is the velocity of the end-effector; and $\dot{v}_e$ is the acceleration of the end-effector; $\Lambda(q) = (JH(q)^{-1}J^T)^{-1}$ is a 6×6 operational space inertia matrix, where J is a body Jacobian in each manipulator frame; $\Gamma(q,\dot{q}) = J^{-T}C(q,\dot{q})J^{-1} - \Lambda(q)\dot{J}J^{-1}$ is a wrench including centrifugal and Coriolis effects; and $\eta(q) = J^{-T}g(q)$ is the wrench of gravitational effects, where H(q) (inertia), $C(q,\dot{q})$ (centrifugal and Coriolis effects), and g(q) (gravitational effects) are the corresponding quantities defined in the joint space; h is a wrench vector, where the vector $h_c = J^{-1}\tau$ is the equivalent end-effector wrench corresponding to the input joint torques $\tau$. A wrench represents the force and torque vectors that arise in applying Newton's laws to a rigid body (e.g., the manipulator). The subscript c refers a quantity to a center of mass of the manipulator, and the subscript e refers a quantity to the end-effector.

Stiffness control of a robotic device is a type of control configured to achieve a commanded static behavior for interaction between the robotic device and the environment. Dynamics of a controlled robotic device may depend on dynamics of a manipulator of the robotic device, which is nonlinear and coupled. An objective for controlling a robotic device may include achieving a specified dynamic behavior for an end-effector coupled to the manipulator. Dynamics of the end-effector could be represented as a second-order mechanical system having six degrees of freedom characterized by a given mass, damping, and stiffness. The given mass, damping, and stiffness may be referred to collectively as mechanical impedance.

One approach to control dynamics of the end-effector may include an acceleration-resolved approach used for motion control of the end-effector. The acceleration resolved approach may be effective to decouple and linearize the non-linear dynamics of the robotic device at a given acceleration level via an inverse dynamics control law. For example, in the presence of interaction of the robotic device with the environment, a control law may be expressed as follows:

$$h_c = \Lambda(q)\alpha + \Gamma(q,\dot{q})\dot{q} + h_e \quad (2)$$

Casting the control law of equation (2) in the dynamic model of equation (2) results in:

$$\dot{v}_e = \alpha \quad (3)$$

where $\alpha$ is a properly designed control input with acceleration referred to a base frame for the robotic device. Considering the identity $\dot{v}_e = \overline{R}_e^T \dot{v}_e^e + \dot{\overline{R}}_e^T v_e^e$, with $$\overline{R}_e = \begin{pmatrix} R_e & 0 \\ 0 & R_e \end{pmatrix},$$

where $R_e$ is a rotational transform matrix referred to the end-effector, $\overline{R}_e$ is the pseudo inverse of $R_e$, and superscript T indicates a transpose of a matrix.

The choice:

$$\alpha = \overline{R}_e \alpha^e + \dot{\overline{R}}_e^T v_e^e \quad (4)$$

results in:

$$\dot{v}_e^e = \alpha_e^e \quad (5)$$

where the control input $\alpha^e$ represents an acceleration referred to the end-effector frame $\tau_e$. Hence, setting:

$$\alpha^e = K_M^{-1}(\dot{v}_d^e + K_D \Delta v_{de}^e + h_\Delta^e - h_e^e) \quad (6)$$

the following expression can be found for the closed-loop system:

$$K_M \Delta \dot{v}_{de}^e + K_D \Delta v_{de}^e + h_\Delta^e = h_e^e \quad (7)$$

where $K_M$ and $K_D$ are 6×6 symmetric and positive definite matrices, $\Delta \dot{v}_{de}^e = \dot{v}_d^e - \dot{v}_e^e$, $\Delta v_{de}^e = v_d^e - v_e^e$, $\dot{v}_d^e$ and $v_d^e$ are, respectively, the acceleration and the velocity of a desired frame $\tau_d$, and $h_\Delta^e$ is an elastic wrench. All these quantities are referred to the end-effector frame $\tau_e$.

Figure 5:
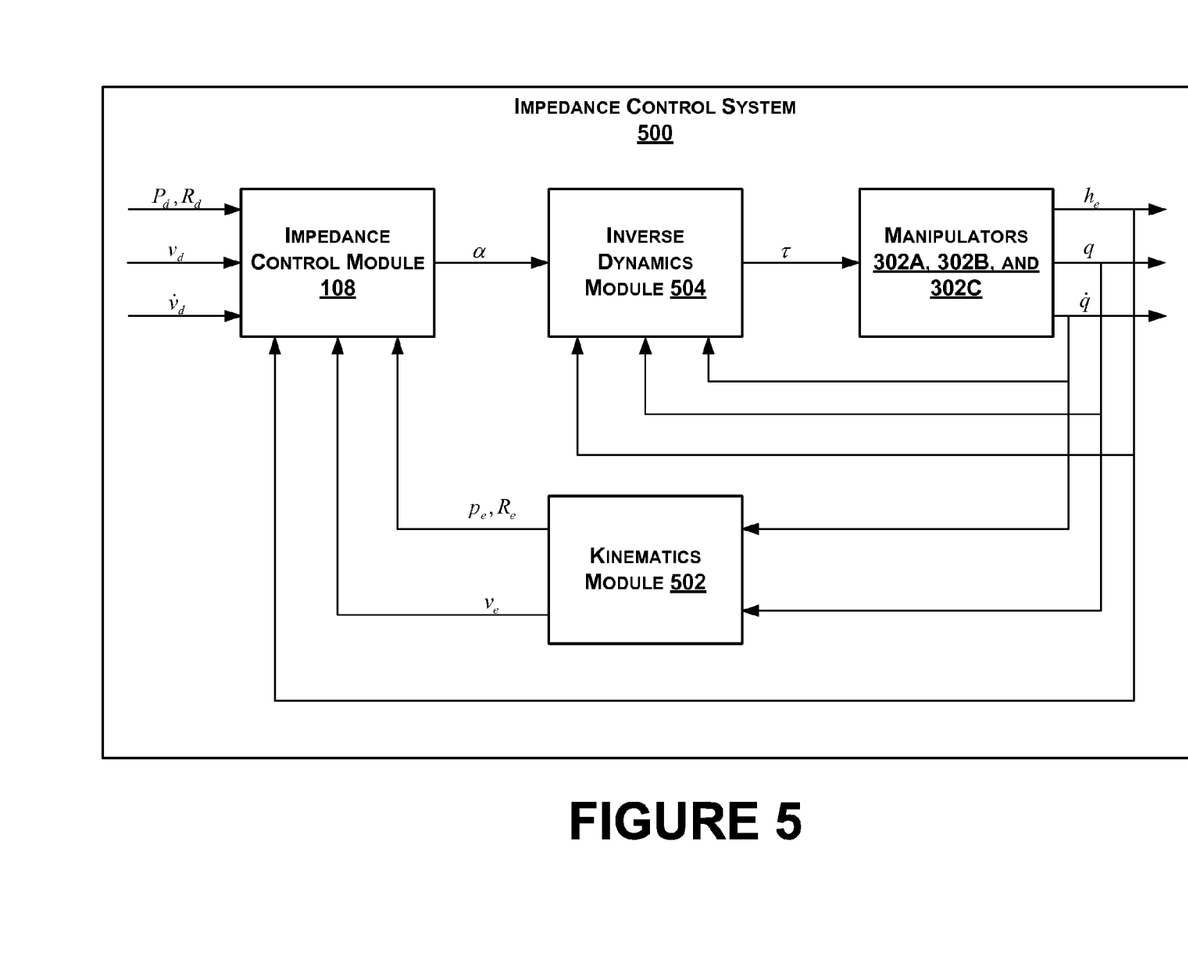
FIG. 5 illustrates a system for implementing impedance control, in accordance with an example embodiment.

FIG. 5 illustrates a system 500 for implementing impedance control, in accordance with an example embodiment. The system 500 includes the manipulators 302A, 302B, and 302C interacting with an environment. The manipulators 302A, 302B, and 302C may include several sensors measuring, for example, position of the end-effector 306 coupled to the manipulator 302C, speeds of the manipulators 302A, 302B, and 302C, forces experienced by the manipulators 302A, 302B, and 302C (or torques experienced at the respective joints), etc. The sensors may be configured to measure the generalized coordinates q related to the manipulators 302A, 302B, and 302C (e.g., angles $\theta_1$, $\theta_2$, and $\theta_3$ of the manipulators 302A, 302B, and 302C), and accordingly the rate of change of the generalized coordinates $\dot{q}$ can be determined. In some examples, the sensors may be configured to measure other quantities from which the generalized coordinates q and their rates of change $\dot{q}$ could be inferred or calculated. As shown in FIG. 5, a vector $h_e$ representing end-effector wrench corresponding to the input joint torques $\tau$ can also be determined for the manipulators 302A, 302B, and 302C.

The quantities, q,$\dot{q}$, and $h_e$ may be input to a kinematics module 502. Kinematics refer to motion of the manipulators 302A, 302B, and 302C without regard to forces or torques that cause the motion. Kinematics of the manipulators 302A, 302B, and 302C describe position, orientation, velocity, acceleration and other higher order derivatives of the position and orientation of the manipulators 302A, 302B, and 302C and the end-effector 306. For example, based on the quantities q,$\dot{q}$, and $h_e$, the kinematics module 502 may be configured to determine the position $p_e$ of the end-effector 306, a rotation matrix $R_e$ for the end-effector 306, and speed $\dot{v}$ of the end-effector 306 taking into consideration geometry of the robotic device 300.

As shown in FIG. 5, the position $p_e$, rotation matrix $R_e$, speed v of the end-effector 306 along with the vector $h_e$ are input to the impedance control module 108. The impedance control module 108 may also be configured to receive a desired or commanded position $p_d$, rotation matrix $R_d$, speed $v_d$ and acceleration $\dot{v}_d$ for the end-effector 306. The commanded position $p_d$, rotation matrix $R_d$, speed $v_d$ and acceleration $\dot{v}_d$ for the end-effector 306 may be determined based on the modified trajectory 406 to be followed by end-effector 306 and the forces to be exerted by end-effector 306 to perform a given task. Based on the inputs to the impedance control module 108, the impedance control module 108 may be configured to determine a control input $\alpha$ (e.g., similar to the control input $\alpha^e$ defined in equation 6) representing an acceleration referred to a frame of the end-effector 306.

The control input $\alpha$ is communicated to an inverse dynamics module 504. The inverse dynamics module 504 may be configured to have access to the kinematics module 502 directly or through the impedance control module 108. The inverse dynamics module 504 also receives the parameters q, $\dot{q}$, and $h_e$ as shown in FIG. 5. Based on the inputs, the kinematics of the manipulators 302A, 302B, and 302C, and the inertial properties (mass and moment of inertia) of the manipulators 302A, 302B, and 302C, the inverse dynamics module 504 may be configured to determine torques $\tau$ to be applied to the manipulators 302A, 302B, and 302C to achieve the commanded position $p_d$, rotation matrix $R_d$, speed $v_d$, and acceleration $\dot{v}_d$ for the end-effector 306. The quantities q,$\dot{q}$, and $h_e$ may indicate that the commanded position $p_d$, rotation matrix $R_d$, speed $v_d$, and acceleration $\dot{v}_d$ were not achieve accurately, i.e., there is a discrepancy or an error between the commanded values and the actual values. Based on the amount of discrepancy or error, the impedance control module 108 may be configured to adjust the control input $\alpha$ to minimize the error.

Components of the system 500 may be configured to work in an interconnected fashion with each other and/or with other components coupled to respective systems. One or more of the described functions or components of the system 500 may be divided up into additional functional or physical components, or combined into fewer functional or physical components. In some further examples, additional functional and/or physical components may be added to the examples illustrated by FIG. 5. Still further, any of the kinematics module 502 and the inverse dynamics module 504 may include or be provided in the form of a processor (e.g., a microprocessor, a digital signal processor (DSP), etc.) configured to execute program code including one or more instructions for implementing logical functions described herein. The system 500 may further include any type of computer readable medium (non-transitory medium) or memory, for example, such as a storage device including a disk or hard drive, to store the program code. In other examples, the system 500 may be included within other systems. In an example, the kinematics module 502 and the inverse dynamics module 504 may be included within the robotic device 300 or the computing device configured to control the robotic device 300.

Equation (7) describes the dynamic behavior of an end-effector such as the end-effector 306. Equation (7) shows that the end-effector 306 behaves like a spring-mass-damper mechanical system, where the stiffness and damping of the spring-mass-damper mechanical system representing the end-effector 306 can be controlled. In this manner, the impedance control module 108 may be configured to cause the manipulator 302C to behave as if the end-effector 306 is connected to the modified trajectory 406 by a spring and a damper.

Figure 6:
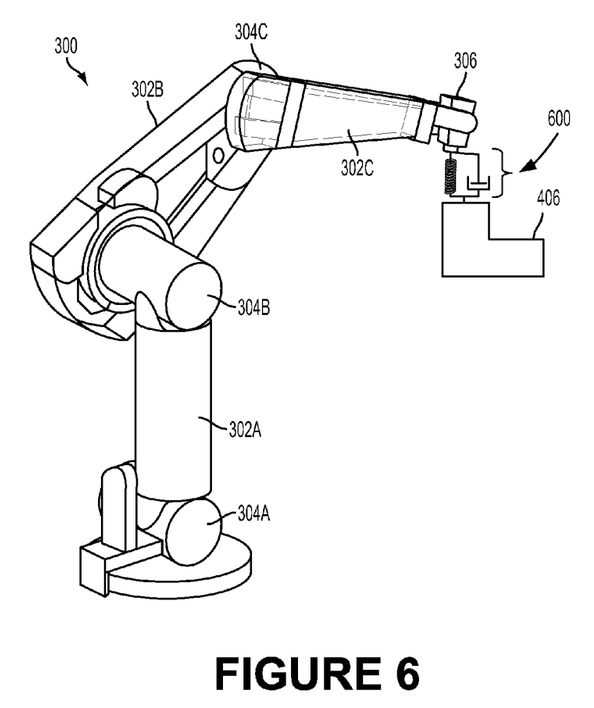
FIG. 6 illustrates a simplified viscous spring connecting an end-effector to the modified trajectory, in accordance with an example embodiment.

FIG. 6 illustrates a simplified viscous spring 600 connecting the end-effector 306 to the modified trajectory 406, in accordance with an example embodiment. FIG. 6 shows the viscous spring 600 having a spring and damper acting in one direction for illustration only. The impedance control module 108 may be configured to cause the manipulator 302C to behave as if the end-effector 306 is connected to the modified trajectory 406 via springs and dampers in all six spatial dimensions (position and orientation in all three spatial dimensions). Such six-dimensional stiffness and damping can be represented by a matrix that represents stiffness and damping in all six spatial dimensions.

If the end-effector 306 deviates from the modified trajectory 406, the manipulator 302C may apply a force, via the viscous spring 600, to bring the end-effector 306 back to the modified trajectory 406 (e.g., maintain contact with the object 400). In an example, such a force is based on (e.g., proportional) to an amount of deviation and/or speed of deviation of the end-effector 306 from the modified trajectory 406.

Thus, the computing device configured to control the robotic device 300 may determine, as described at FIG. 5, the torques τ to be applied to manipulators 302A, 302B, and 302C via the joints 302A, 302B, and 302C so as to cause the end-effector 306 to follow the modified trajectory 306 and exert the forces defined by the task information.

Referring back to FIG. 2, at block 208, the method 200 includes causing the torques to be applied to the manipulator via the joint so as to cause the end-effector to follow the modified trajectory and substantially exert the forces along the modified trajectory. As described above, the joints 304A, 304B, and 304C may include electric or hydraulic motors, or any other actuation means. Such actuation means may receive, from the computing device configured to control the robotic device 300, signals corresponding to the torques τ, and accordingly actuate and move the manipulators 302A, 302B, and 302C. As a result of moving the manipulators 302A, 302B, and 302C, the end-effector 306 may follow the modified trajectory 406 and substantially exert the forces defined by the task information along the modified trajectory 406.

The word "substantially" is used herein to indicate that the forces exerted by the end-effector 306 are within a threshold value from the forces defined by the task information. For example, if the force exerted by the end-effector 306 at a given point along the modified trajectory 406 is within about ±2% from the force defined by the task information, the end-effector 306 may be considered to have substantially exerted the force defined by the task information. In examples, the threshold value may be defined in units of force (e.g., ±20 Newton, lbf., etc.) instead of a percentage. In some examples, the force exerted by the end-effector may not be allowed to exceed the force defined by the task information. Thus, instead of the forced exerted by the end-effector 306 being within ± a given value from the force defined by the task information, the force exerted by the end-effector 306 is allowed to be within the given value below, but not above, the force defined by the task information to consider the force to have been substantially exerted.

Referring back to FIG. 2, at block 210, the method 200 includes, as the end-effector follows the modified trajectory, receiving force feedback information from a sensor coupled to the robotic device indicating respective forces being experienced by the end-effector at respective points along the modified trajectory. As described with respect to the sensor feedback and estimation module 114, a robotic device such as the robotic device 300 may be configured to include a plurality of sensors coupled to the manipulators 302A, 302B, and 302C and the end-effector 306. The plurality of sensor may include, for example, position sensors, force sensors, torque sensors, vision sensors, etc. In an example, a force sensor coupled to the end-effector 306 may be configured to measure forces experienced by end-effector 306 as the end-effector 306 follows the modified trajectory 406. In another example, torque sensors coupled to the joints 304A, 304B, and 304C may be configured to measure torques experienced at the joints 304A, 304B, and 304C. The forces experienced by the end-effector 306 and/or the torques experienced by the joints 304A, 304B, and 304C may be indicative of the forces exerted by the end-effector 306 on the object 400 as the end-effector 306 follows the modified trajectory 406.

Other sensors coupled to the robotic device 300 may be configured to measure spatial position of the end-effector 306 and/or other parts of the robotic device 300 such as a center of gravity of the robotic device 300, or one or all of the manipulators 302A, 302B, and 302C. The computing device configured to control the robotic device 300 may thus be configured to receive sensor feedback information indicating how close the forces experienced by the end-effector 306 are to the forces defined by the task information to be exerted by the end-effector 306. The sensor feedback information may also indicate how close the end-effector 306 is following the modified trajectory 406.

Referring back to FIG. 2, at block 212, the method 200 includes adjusting the torques to be applied to the manipulator based on the force feedback information as the end-effector follows the modified trajectory. As described at block 210, the computing device may be configured to receive sensor feedback information indicating how close the forces experienced by the end-effector 306 are to the forces defined by the task information to be exerted by the end-effector 306, and how close the end-effector 306 is following the modified trajectory 406. Based on the sensor feedback information, the computing device may be configured to determine that deviation from the modified trajectory 406 and/or the forces defined by task information is larger than a threshold deviation or error allowed. For instance, the threshold deviation or error may be predefined as a percentage deviation such as a 4% deviation from the modified trajectory 406 or the forces defined by the task information. Any other percentage could be used. The percentage may be based on a type of the object and/or nature of the task to be performed by the robotic device 300. In examples, instead of a percentage, the threshold error may be defined in quantities such as a deviation of 5 mm from the modified trajectory 406 and a deviation of 10 N from a given force defined by the task information to be exerted at a given point along the modified trajectory 406. These values are examples for illustration and may be different based on the task. If the deviation in position or force exceeds the threshold deviation, the computing device may be configured to adjust (e.g., via the impedance control module 108 and the inverse dynamics module 504) the torques to be applied to the manipulators 302A, 302B, and 302C so as to cause the deviation to be less than the threshold deviation.

In an example, the computing device may determine, based on the sensor feedback information, that a force experienced by the end-effector 306 is larger than a threshold force. In another example, the computing device may determine, based on the sensor feedback information, that force experienced by the end-effector 306 exceeds the force defined by the task information to be applied at a particular point of the modified trajectory 406 by a threshold force deviation. In these examples, the computing device may adjust the parameters of the impedance control module 108 to adjust the torques to be applied to the manipulators 302A, 302B, and 302C so as to change speed of motion of the end-effector 306. For instance, the computing device may adjust the torques so as to reduce the speed of motion of the end-effector 306. Reducing the speed of motion of the end-effector 306 may reduce the force experienced by the end-effector 306. As an example for illustration, the task may involve deburring the object 400. While deburring the object 400, the end-effector 306 may encounter a particularly large burr, which might induce a large force at the end-effector 306. In response, the computing device may be configured to allow the end-effector 306 to deviate from the modified trajectory 406, and adjust the parameters of the impedance control module 108 so as to adjust the torques to be applied to the manipulators 302A, 302B, and 302C. As a result of deviation from the modified trajectory 406 and adjustments to the parameters, the force induced at the end-effector 306 may be reduced. The computing device may also be configured to slow down execution of the task, and possibly perform multiple passes over a section of the object 400 (e.g., repeat the task over the section) having the large burr until the large burr becomes a smooth edge.

In another example, the computing device may determine, receive, or have access to material property information indicative of a type of material of the object 400 and properties of the material. Properties of the material may include chemical properties (e.g., surface tension and energy), manufacturing properties (e.g., hardness, machinability rating, machining speeds and feeds), and mechanical properties (e.g., compressive strength, ductility, fatigue limit, flexural modulus, flexural strength, plasticity, Poisson's ratio, resilience, shear modulus, shear strain, shear strength, specific modulus, specific strength, tensile strength, yield strength, Young's modules, coefficient of friction, coefficient of restitution, roughness, etc.). Based on the material property information, the computing device may be configured to determine an appropriate speed of motion of the end-effector 306 while following the modified trajectory 406 and pressures to be exerted by the end-effector 306 to induce the forces defined by the task information.

In one example, adjusting the torques to reduce the forces experienced by the end-effector 306 may cause the end-effector 306 to permissibly deviate from the modified trajectory 406. In this example, reducing the forces experienced by the end-effector 306 may be a higher priority than adhering to the modified trajectory 406. However, in other examples involving other types of objects or tasks, adhering to the modified trajectory 406 may be a higher priority than reducing the forces experienced by the end-effector 306. In these examples where adhering to the modified trajectory 406 may be a higher priority than reducing the forces experienced by the end-effector 306, the computing device may cause the robotic device 300 to stop and repeat a portion of the task. The computing device may adjust the torques applied to the manipulators 302A, 302B, and 302C so as to adjust the forces experienced by the end-effector 306 while adhering to the modified trajectory 406.

In an example, the computing device may determine an initial orientation for the end-effector 306. During performance of the task, the computing device may determine that the initial orientation is not optimal because, for example, the end-effector 306 is experiencing higher forces than allowed, or because of a loss of contact between the end-effector 306 and the object. For instance, an orientation suitable for a given object having a given geometry may not be suitable for another object having a different geometry. In response, the computing device may modify the initial orientation of the end-effector 306 to a different orientation more appropriate to the task. The modified orientation may be effective to maintain contact between the end-effector 306 and/or reduce the forces experienced by the end-effector 306.

In an example, the computing device may cause the robotic device 300 to perform the task or a portion of the task and receive feedback indicative of success or failure in following the portion of the task. Success or failure may be indicated by how closely the end-effector 306 follows the modified trajectory 406 and how close the forces experienced by the end-effector 306 are to the forces defined by the task information. The feedback may be provided by a user or may be determined by the computing device based on sensor feedback information. In response, the computing device may adjust the modified trajectory 406 and/or the torques to be applied to the manipulators 302A, 302B, and 302C. Further, the computing device may cause the robotic device 300 to repeat the portion of the task based on adjustments to the modified trajectory 406 and/or the torques. The process of receiving feedback and repeating the portion may be continued until the portion of the task is performed satisfactorily. Performing the portion of the task satisfactorily may be indicated by the end-effector 306 being within a threshold position error from the modified trajectory 406, and the forces being experienced by the end-effector 306 being within a threshold force error from the forces defined by the task information to be exerted by the end-effector 306.

In another example, based on performing the portion of the task and/or the sensor feedback information, a user observing the task may revise the task information, i.e., revise the nominal trajectory 402 and/or the forces to be exerted by the end-effector 306. Revising the task information may also be based on the sensor feedback information. Revising the task information may include, for example, providing a modified CAD model to the computing device (e.g., to the input module 102). As another example, the user may revise the task information by way of a user-interface displayed on a display coupled to the robotic device 300. Based on the revised task information, the computing device may determine a revised modified trajectory to be followed by the end-effector 306. The user may also revise the modified trajectory further.

Although the method 200 is described relative to performing a task on an object, the method 200 can also be used or other tasks such as an insertion task or any other task contemplated to be performed by a robotic device.

Figure 7:
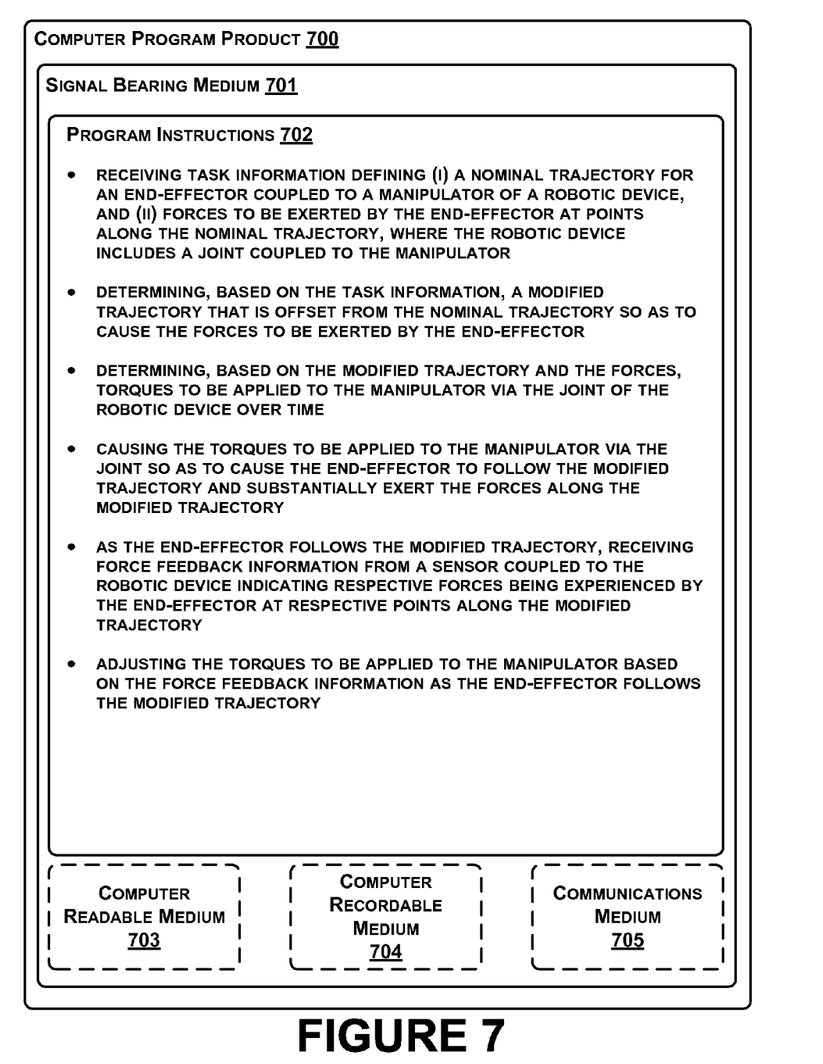
FIG. 7 is a schematic illustrating a conceptual partial view of a computer program, in accordance with an example embodiment.

In some embodiments, the disclosed methods may be implemented as computer program instructions encoded on a computer-readable storage media in a machine-readable format, or on other non-transitory media or articles of manufacture. FIG. 7 is a schematic illustrating a conceptual partial view of an example computer program product 700 that includes a computer program for executing a computer process on a computing device, arranged according to at least some embodiments presented herein. In one embodiment, the example computer program product 700 is provided using a signal bearing medium 701. The signal bearing medium 701 may include one or more program instructions 702 that, when executed by one or more processors may provide functionality or portions of the functionality described above with respect to FIGS. 1-6. Thus, for example, referring to the embodiments shown in FIG. 2, one or more features of blocks 202-212 may be undertaken by one or more instructions associated with the signal bearing medium 701. In addition, the program instructions 702 in FIG. 7 describe example instructions as well.

In some examples, the signal bearing medium 701 may encompass a computer-readable medium 703, such as, but not limited to, a hard disk drive, a Compact Disc (CD), a Digital Video Disk (DVD), a digital tape, memory, etc. In some implementations, the signal bearing medium 701 may encompass a computer recordable medium 704, such as, but not limited to, memory, read/write (R/W) CDs, R/W DVDs, etc. In some implementations, the signal bearing medium 701 may encompass a communications medium 705, such as, but not limited to, a digital and/or an analog communication medium (e.g., a fiber optic cable, a waveguide, a wired communications link, a wireless communication link, etc.). Thus, for example, the signal bearing medium 701 may be conveyed by a wireless form of the communications medium 705 (e.g., a wireless communications medium conforming to the IEEE 802.11 standard or other transmission protocol).

The one or more programming instructions 702 may be, for example, computer executable and/or logic implemented instructions. In some examples, a computing device such as any of the computing devices or modules described with respect to FIGS. 1-6 may be configured to provide various operations, functions, or actions in response to the programming instructions 702 conveyed to the computing device by one or more of the computer readable medium 703, the computer recordable medium 704, and/or the communications medium 705. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

IV. Conclusion

It should be understood that arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving polishing task information associated with polishing an object, wherein the polishing task information define (i) a nominal trajectory for an end-effector coupled to a manipulator of a robotic device, wherein the nominal trajectory is associated with at least a portion of a contour of the object, and (ii) forces to be exerted by the end-effector at points along the nominal trajectory, wherein the robotic device includes a joint coupled to the manipulator;
determining, based on the polishing task information, a modified trajectory that is offset from the nominal trajectory so as to cause the forces to be exerted by the end-effector;
determining, based on the modified trajectory and the forces, torques to be applied to the manipulator via the joint of the robotic device over time; and
causing the torques to be applied to the manipulator via the joint so as to cause the end-effector to follow the modified trajectory and substantially exert the forces along the modified trajectory to polish the portion of the contour of the object.

2. The method of claim 1, wherein an offset between points of the modified trajectory and the points of the nominal trajectory is proportional to the forces defined by the polishing task information.

3. The method of claim 1, further comprising:
receiving material property information indicative of a type of material of the object; and
determining, based on the material property information, a speed of motion of the end-effector while following the modified trajectory and pressures to be exerted by the end-effector to induce the forces defined by the polishing task information.

4. The method of claim 1, further comprising:
as the end-effector follows the modified trajectory, receiving force feedback information from a sensor coupled to the robotic device indicating respective forces being experienced by the end-effector at respective points along the modified trajectory; and
adjusting the torques to be applied to the manipulator based on the force feedback information as the end-effector follows the modified trajectory.

5. The method of claim 4, further comprising:
determining an initial orientation for the end-effector; and
modifying the initial orientation of the end-effector based on the force feedback information so as to maintain contact between the end-effector and a surface of the object as the end-effector follows the modified trajectory.

6. The method of claim 5, further comprising:
adjusting a speed of motion of the end-effector based on the force feedback information as the end-effector follows the modified trajectory.

7. The method of claim 6, wherein the force feedback information indicates that a given force being experienced by the end-effector at a given point is larger than a force defined by the polishing task information for the given point, wherein adjusting the speed of motion of the end-effector comprises:
causing the speed of motion the end-effector to be reduced.

8. The method of claim 4, further comprising:
causing the end-effector to repeat a portion of the modified trajectory based on the force feedback information indicating that a given force being experienced by the end-effector at a given point along the modified trajectory is greater than a threshold force.

9. The method of claim 4, wherein adjusting the torques to be applied to the manipulator causes the end-effector to deviate from the modified trajectory.

10. The method of claim 4, further comprising:
receiving revised polishing task information, wherein the polishing task information is revised based on the force feedback information; and
determining a revised trajectory to be followed by the end-effector based on the revised polishing task information.

11. The method of claim 1, further comprising:
generating a display of the nominal trajectory, the modified trajectory, and a visual indication of direction and magnitude of the forces to be applied by the end-effector along the modified trajectory;
receiving, based on interaction with the display, an input indicative of a request to change one or more of the nominal trajectory, the modified trajectory, and the direction and magnitude of the forces to be applied by the end-effector along the modified trajectory; and
in response to receiving the input, revising the torques to be applied to the manipulator as the end-effector follows the modified trajectory.

12. The method of claim 1, further comprising:
receiving feedback responsive to the end-effector following a portion of the modified trajectory, wherein the feedback is indicative of success or failure in following the portion;
adjusting one or more of (i) the modified trajectory, and (ii) the torques to be applied to the manipulator based on the feedback; and
causing the end-effector to repeat the portion based on adjustments to the one or more of (i) the modified trajectory, and (ii) the torques.

13. A non-transitory computer readable memory having stored thereon instructions that, when executed by a computing device, cause the computing device to perform operations comprising:
receiving task information defining (i) a nominal trajectory for an end-effector coupled to a manipulator of a robotic device, and (ii) forces to be exerted by the end-effector at points along the nominal trajectory, wherein the robotic device includes a joint coupled to the manipulator;
determining, based on the task information, a modified trajectory that is offset from the nominal trajectory so as to cause the forces to be exerted by the end-effector;
determining, based on the modified trajectory and the forces, torques to be applied to the manipulator via the joint of the robotic device over time; and
causing the torques to be applied to the manipulator via the joint so as to cause the end-effector to follow the modified trajectory and substantially exert the forces along the modified trajectory.

14. The non-transitory computer readable memory of claim 13, wherein the operations further comprise:
as the end-effector follows the modified trajectory, receiving force feedback information from a sensor coupled to the robotic device indicating respective forces being experienced by the end-effector at respective points along the modified trajectory; and
adjusting the torques to be applied to the manipulator based on the force feedback information as the end-effector follows the modified trajectory.

15. The non-transitory computer readable memory of claim 14, wherein the operations further comprise:
adjusting a speed of motion of the end-effector based on the force feedback information as the end-effector follows the modified trajectory.

16. The non-transitory computer readable memory of claim 13, wherein the nominal trajectory is associated with a contour of an object, and the forces are to be exerted by the end-effector on the object.

17. The non-transitory computer readable memory of claim 13, wherein an offset between points of the modified trajectory and the points of the nominal trajectory is proportional to the forces defined by the task information.

18. A robotic device, comprising:
a manipulator;
an end-effector coupled to the manipulator;
a sensor;
a joint coupled to the manipulator;
one or more processors; and
memory configured to store instructions, that when executed by the one or more processors, cause the robotic device to perform operations comprising:
receiving task information defining (i) a nominal trajectory for the end-effector, and (ii) forces to be exerted by the end-effector at points along the nominal trajectory;
determining, based on the task information, a modified trajectory that is offset from the nominal trajectory so as to cause the forces to be exerted by the end-effector;
determining, based on the modified trajectory and the forces, torques to be applied to the manipulator via the joint over time; and
causing the torques to be applied to the manipulator via the joint so as to cause the end-effector to follow the modified trajectory and substantially exert the forces along the modified trajectory.

19. The robotic device of claim 18, wherein the operations further comprise:
as the end-effector follows the modified trajectory, receiving force feedback information from the sensor indicating respective forces being experienced by the end-effector at respective points along the modified trajectory; and
adjusting the torques to be applied to the manipulator based on the force feedback information as the end-effector follows the modified trajectory.

20. The robotic device of claim 18, wherein the operations further comprise:
receiving feedback responsive to the end-effector following a portion of the modified trajectory, wherein the feedback is indicative of success or failure in following the portion;
adjusting one or more of (i) the modified trajectory, and (ii) the torques to be applied to the manipulator based on the feedback; and
causing the end-effector to repeat the portion based on adjustments to the one or more of (i) the modified trajectory, and (ii) the torques.

* * * * *